United States Patent
Baveja et al.

(10) Patent No.: US 9,935,834 B1
(45) Date of Patent: Apr. 3, 2018

(54) AUTOMATED CONFIGURATION OF VIRTUAL PORT CHANNELS

(71) Applicant: CISCO TECHNOLOGY, INC., San Jose, CA (US)

(72) Inventors: Avni Baveja, San Jose, CA (US); Samar Sharma, San Jose, CA (US); Mitali Parthasarathy, Sunnyvale, CA (US); Ashish Purushottam Attarde, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

(21) Appl. No.: 14/869,722

(22) Filed: Sep. 29, 2015

Related U.S. Application Data

(60) Provisional application No. 62/133,161, filed on Mar. 13, 2015.

(51) Int. Cl.
- *G06F 15/16* (2006.01)
- *H04L 12/24* (2006.01)
- *H04L 29/08* (2006.01)
- *H04L 12/46* (2006.01)

(52) U.S. Cl.
CPC ...... *H04L 41/0846* (2013.01); *H04L 12/4641* (2013.01); *H04L 41/0886* (2013.01); *H04L 41/12* (2013.01); *H04L 69/324* (2013.01)

(58) Field of Classification Search
CPC ............. H04L 41/0846; H04L 12/4641; H04L 41/0886; H04L 41/12; H04L 69/324
See application file for complete search history.

(56) References Cited

U.S. PATENT DOCUMENTS

| | | |
|---|---|---|
| 6,601,084 B1 | 7/2003 | Bhaskaran et al. |
| 6,779,039 B1 | 8/2004 | Bommareddy |
| 6,996,615 B1 | 2/2006 | McGuire |
| 7,284,053 B1 | 10/2007 | O'Rourke |
| 7,415,523 B2 | 8/2008 | O'Rourke |
| 7,542,423 B1 | 6/2009 | Morishige |
| 7,623,455 B2 | 11/2009 | Hilla |
| 7,852,774 B2 | 12/2010 | Shen et al. |
| 8,259,722 B1 | 9/2012 | Kharitonov |
| 8,553,552 B2 | 10/2013 | Hu |
| 8,868,726 B1 | 10/2014 | Tu |
| 8,937,942 B1 | 1/2015 | Li |
| 9,246,998 B2 | 1/2016 | Kumar |
| 9,503,397 B2 * | 11/2016 | Anantharam ........... H04L 49/70 |
| 9,667,571 B2 * | 5/2017 | Anantharam ........... H04L 49/70 |

(Continued)

*Primary Examiner* — Moustafa M Meky

(57) ABSTRACT

In an example, there is disclosed a computing apparatus for providing an integrated service engine on a service appliance, including one or more logic elements providing a service appliance engine operable for performing a service appliance function; and one or more logic elements providing a protocol engine operable for: detecting that a plurality of upstream network switches are connected to the service appliance in a virtual port channel configuration; and provisioning virtual port channel (VPC) services comprising replicating a routing policy to each of the plurality of upstream network switches. There is also disclosed one or more computer-readable mediums having stored thereon instructions for providing the foregoing, and a computer-implemented method of performing the foregoing operations.

21 Claims, 11 Drawing Sheets

(56) References Cited

U.S. PATENT DOCUMENTS

| | | |
|---|---|---|
| 2003/0097405 A1 | 5/2003 | Laux |
| 2005/0207420 A1 | 9/2005 | Shanklin |
| 2005/0281205 A1 | 12/2005 | Chandwadkar |
| 2005/0281257 A1 | 12/2005 | Yazaki |
| 2006/0098573 A1 | 5/2006 | Beer |
| 2006/0227705 A1 | 10/2006 | Chandwadkar |
| 2007/0165622 A1 | 7/2007 | O'Rourke |
| 2008/0084880 A1 | 4/2008 | Dharwadkar |
| 2009/0135722 A1 | 5/2009 | Boers et al. |
| 2011/0235508 A1 | 9/2011 | Goel |
| 2011/0261811 A1 | 10/2011 | Battestille et al. |
| 2011/0283013 A1 | 11/2011 | Grosser |
| 2012/0027017 A1* | 2/2012 | Rai ............ H04L 12/18 370/392 |
| 2012/0163164 A1 | 6/2012 | Terry |
| 2012/0163180 A1 | 6/2012 | Goel |
| 2012/0188891 A1 | 7/2012 | Valimaa et al. |
| 2012/0246637 A1 | 9/2012 | Kreeger |
| 2012/0303809 A1 | 11/2012 | Patel |
| 2013/0044636 A1 | 2/2013 | Koponen |
| 2013/0155846 A1* | 6/2013 | Ramachandran ... H04L 12/4641 370/225 |
| 2013/0235868 A1 | 9/2013 | Owens |
| 2013/0272305 A1 | 10/2013 | Lefebvre |
| 2013/0343408 A1 | 12/2013 | Cook |
| 2014/0019602 A1 | 1/2014 | Murthy |
| 2014/0025986 A1 | 1/2014 | Kalyanaraman et al. |
| 2014/0201346 A1* | 7/2014 | Anantharam ........... H04L 49/70 709/223 |
| 2014/0201349 A1* | 7/2014 | Anantharam ........... H04L 49/70 709/223 |
| 2014/0321462 A1 | 10/2014 | Kancherla |
| 2015/0326506 A1* | 11/2015 | Chippa ............... H04L 41/5054 709/226 |
| 2016/0182379 A1 | 6/2016 | Mehra |
| 2016/0251607 A1 | 9/2016 | Kwak |
| 2016/0337244 A1 | 11/2016 | Baveja et al. |

* cited by examiner

AUTOMATED CONFIGURATION OF VIRTUAL PORT CHANNELS

CROSS REFERENCE TO RELATED APPLICATIONS

This application claims priority to U.S. Provisional Application Ser. No. 62/133,161, filed Mar. 13, 2015, titled "Virtual Port Channel Integration," which is incorporated by reference in its entirety.

FIELD OF THE SPECIFICATION

This disclosure relates in general to the field of communications and, more particularly, to a system and method for automated configuration of virtual port channels.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
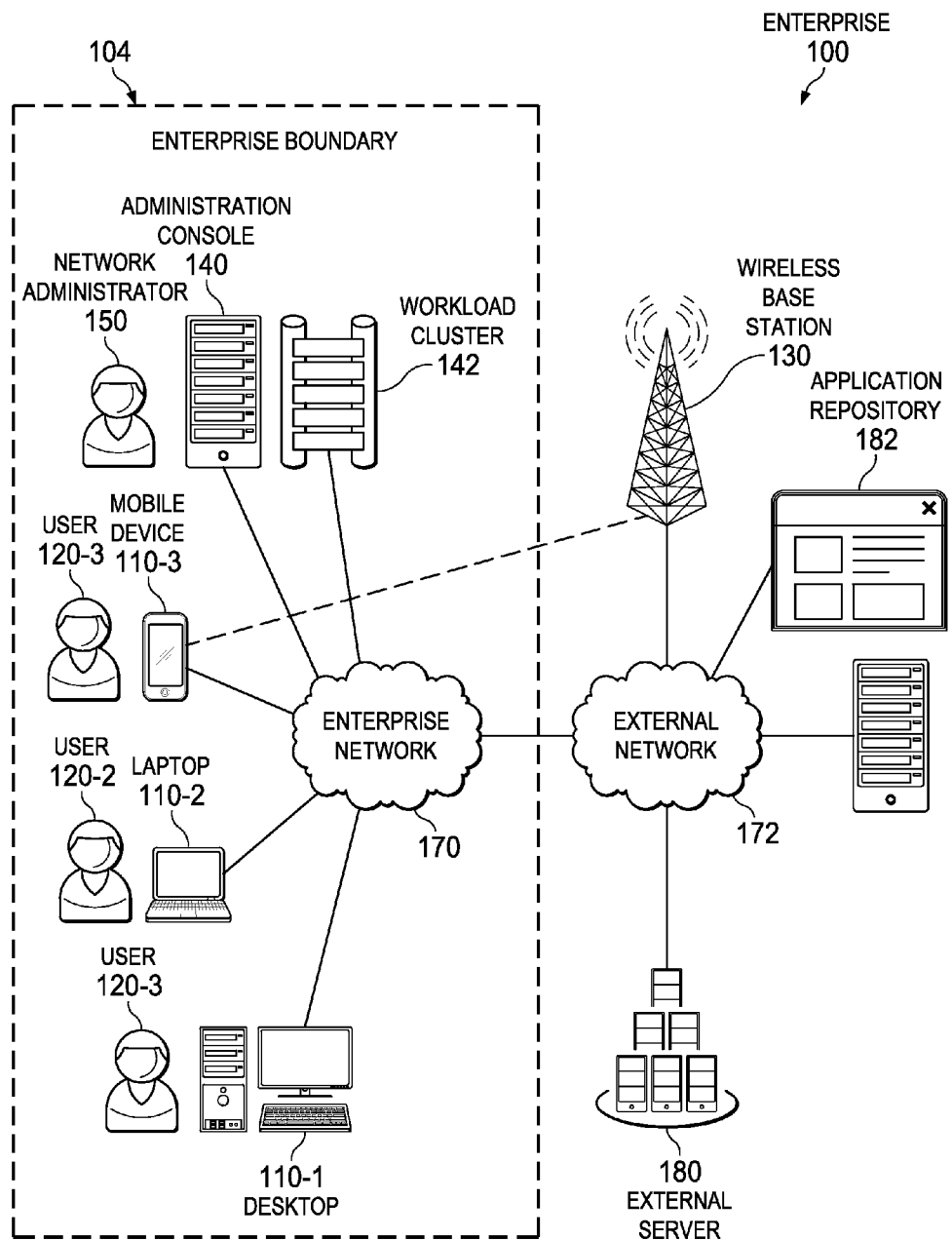
FIG. 1A is a network level diagram of an enterprise computing environment according to one or more examples of the present Specification.

In an example, there is disclosed a computing apparatus for providing an integrated service engine on a service appliance, including one or more logic elements providing a service appliance engine operable for performing a service appliance function; and one or more logic elements providing a protocol engine operable for: detecting that a plurality of upstream network switches are connected to the service appliance in a virtual port channel configuration; and provisioning virtual port channel (VPC) services comprising replicating a routing policy to each of the plurality of upstream network switches. There is also disclosed one or more computer-readable mediums having stored thereon instructions for providing the foregoing, and a computer-implemented method of performing the foregoing operations.

EMBODIMENTS OF THE DISCLOSURE

The following disclosure provides many different embodiments, or examples, for implementing different features of the present disclosure.

Network services are often inserted into a network. The network services may be services not included in the standard IP protocol. For example, the network services may include, by way of nonlimiting example, load balancing or application delivery services. The network services may be performed by one or more service appliances, which may be server blades integrated into network elements (e.g., switches, routers, etc.) or external appliances. The provision of network services typically necessitates manual configuration of network elements and network nodes (e.g., servers).

For example, when providing load balancing or application delivery services, a client device sends a request (e.g., one or more packets) that is intercepted by a service application running on one or more of the service appliances. The service application is configured to select a server among a group of servers to fulfill the request and to transmit the request to the selected server. To ensure that return packets (e.g., packets flowing from the selected server to the client device) are transmitted via the service application, one of the following steps is taken: (1) routing/redirection rules are setup on each of the network elements, (2) the service appliance is configured to perform source network address translation (NAT), or (3) the service appliance is setup as a gateway on each of the servers.

Methods and apparatuses for automating return traffic redirection to a service appliance by injecting forwarding policies in a packet-forwarding element are disclosed herein. An example method for automating return traffic redirection can include: establishing a communication channel between a service appliance and a packet-forwarding element; and transmitting an out-of-band message over the communication channel to the packet-forwarding element. The method steps above can be performed by the service appliance, for example. Additionally, the message can include a forwarding policy that requests the packet-forwarding element to forward predetermined packets to the service appliance.

Optionally, the message can be a policy-based routing (PBR) rule. For example, the PBR rule can include one or more criteria and corresponding forwarding rules. Additionally, the one or more criteria and corresponding forwarding rules can be based on source addresses of the predetermined packets.

In some implementations, the method can further include: receiving a packet having a source address of a client device and a destination address of the service appliance; performing a load balancing algorithm to select a server among one or more servers; changing the destination address of the packet to an address of the selected server; and forwarding the packet having the source address of the client device and the destination address of the selected server. These method steps can also be performed by the service appliance, for example.

In addition, the method can include: receiving a message from the packet-forwarding element indicating a change in network configuration; generating an updated forwarding policy that reflects the change in network configuration; and transmitting an updated out-of-band message over the communication channel to the packet-forwarding element. The message can also include the updated forwarding policy. These method steps can also be performed by the service appliance, for example.

Optionally, the communication channel can be a port channel. Alternatively or additionally, the service appliance can be configured to perform a load-balancing service.

Another example method for automating return traffic redirection can include: establishing a communication channel between a service appliance and a packet-forwarding element; and receiving an out-of-band message over the communication channel from the service appliance. The method steps discussed above can be performed by the packet-forwarding element, for example. Additionally, the message can include a forwarding policy that requests the packet-forwarding element to forward predetermined packets to the service appliance.

Optionally, the message can be a policy-based routing (PBR) rule. For example, the PBR rule can include one or more criteria and corresponding forwarding rules. Additionally, the one or more criteria and corresponding forwarding rules can be based on source addresses of the predetermined packets.

In some implementations, the method can include: receiving a return packet having a source address of a server and a destination address of a client device; determining whether to forward the return packet to the service appliance based on the forwarding policy; and transmitting or not transmitting the return packet to the service appliance based on the determination. These method steps can also be performed by the packet-forwarding element, for example.

Alternatively or additionally, the method can include: transmitting a message to the service appliance indicating a change in network configuration; and receiving an updated out-of-band message over the communication channel from the service appliance. These method steps can also be performed by the packet-forwarding element, for example. In addition, the message can include an updated forwarding policy that reflects the change in network configuration.

Optionally, the method can also include transmitting the out-of-band message to one or more adjacent packet-forwarding elements. This method step can be performed by the packet-forwarding element, for example.

Optionally, the communication channel can be a port channel.

Furthermore, a PBR may include automated PBR (APBR), which allows service appliance to program policies on a switch interface to redirect return traffic to a service appliance set up in "one-arm mode." In one-arm mode, an application control engine (ACE) is configured with a single VLAN that handles both client requests and server responses. In an example, one-arm mode is configured with client-source network address translation (NAT) or PBR to send requests through the same VLAN to the server. Since it is desirable to retain the client IP for the return traffic, the APBR policies may set the "next hop" IP of traffic reaching the switch to the IP of service appliance without modifying the packet. The service appliance may then direct the packet to the client.

In various embodiments, the present Specification provides, by way of nonlimiting example:
  a. A method for Adding/Deleting redirect rules for server traffic.
  b. A method for service appliance high availability (HA).
  c. APBR states and an APBR state machine.
  d. Automatic policy based routing message formats.
  e. VPC support.
  f. Automatic purge of rules on events.

In an example, PBR rules are configured by system administrators to ensure that return traffic from the real server reaches the service appliance. The switch control channel can be used to automate the task of creating PBR rules. The service appliance, as a function of its configuration, knows the IP address of the real servers and sends this information to the switch in a request. The switch in turn creates the PBR rules for the associated switch virtual interfaces (SVIs).

A method for adding redirect rules for server traffic may include:
  a. The APBR request sent by the service appliance includes the real server IP, port and protocol.
  b. On receiving the request, an intelligent service card manager (ISCM) creates an access control list (ACL) using the above attributes for each service appliance nexthop IP and incorporates it into a routemap.
  c. This routemap is applied on the switch interface through which the real server can be best reached.
  d. The interface on which the APBR policy is applied can be a L2 or L3 interface.

In an example, the following method is used for creating an apbr policy:
  a. Create an ACL
    i. Create an ACL with name rise-system-acl-<nexthop ip>-<nexthop interface>. The rule in the ACL contains the protocol, real server (RS) IP, and port. Protocols may include, by way of nonlimiting example, tcp (6), udp (17) or 0. If 0 is sent both tcp and udp rules are installed. An example rule may appear as follows:
IP access list _rise-system-acl-10.1.1.2-Vlan100
10 permit tcp 10.1.1.3/32 eq 8080 any
  b. Create a routemap
    i. Create a routemap with the match clause as the ACL and set clause as the nexthop IP to which the traffic should be redirected. For example, route-map _rise-system-rmap-Vlan100, permit, sequence 1. Match clauses may include, by way of nonlimiting example:

ip address (access-lists): _rise-system-acl-10.1.1.2-Vlan100
Set clauses may include by way of nonlimiting example:
ip next-hop 10.1.1.2
   c. Associate ACL to routemap
   d. Assign service appliance nexthop IP to routemap
   e. Apply the routemap to the rs nexthop interface. For example:
interface Vlan100
ip address 10.1.1.1/24
ip policy route-map _rise-system-rmap-Vlan100 no shutdown
   f. Sequence done/fail.

After the event sequence has reached the done/fail operation, the response status may be set to RISE_OK, RISE_FAIL, RISE_OK_DUP, RISE_CORRUPT based on the success, failure, duplication, corruption of the apbr policy creation. For responses with RISE_OK_DUP or RISE_CORRUPT, the service appliance should not retry the request and should fix its cache accordingly.

If an event sequence reaches the fail step because of internal error the APBR entry may be marked corrupt. Corrupt entries may not be displayed in 'show rise' command In an example, the following method is used for deleting an APBR policy:
   a. Evaluate deletion
   b. Remove routemap from interface
   c. Delete the routemap
   d. Delete the ACE rule in ACL
   e. Delete the ACL
   f. Sequence Done/Fail Regarding HA and non disruptive appliance failover, during normal operation, APBR add requests may be sent from both the primary and secondary appliance. The switch receives the requests and creates one APBR rule, but internally a reference count of the number appliances (services) using this rule ise maintained. When appliance failover happens, the old primary sends a purge request to delete all the APBR rules for that service. The switch then decrements the corresponding reference counts (but does not delete the rule from hardware) and sends a success to the old primary. The old primary (new secondary) then sends an add requests for itself. If the purge was not successful for any reason, the switch sends a failure response and the old primary retries the purge.

Since primary and secondary share the same policy and the policy is only applied once this may save time and resources when both appliances delete the policy.

Regarding the APBR state machine, states may include the following:

TABLE 1

APBR State Machine

| Route_state | Op_mode | Action |
|---|---|---|
| SCM_APBR_ADD_IN_PROGRESS | RISE_ADD/ RISE_DELETE | Set response_status as RISE_ADD_IN_PROG; do no processing |
| ISCM_APBR_DEL_IN_PROGRESS | RISE_ADD/ RISE_DELETE | Set response_status as RISE_DEL_IN_PROG; do no processing |
| ISCM_APBR_ADD_DONE | RISE_ADD | Set response_status as RISE_OK_DUP; syslog; do no processing |
| ISCM_APBR_CORRUPT | RISE_ADD/ RISE_DELETE | Set response_status as RISE_CORRUPT; syslog; do no processing |
| ISCM_APBR_ADD_FAIL | RISE_ADD | Set response_status as RISE_FAIL; entry can be retried by appliance |
| ISCM_APBR_DEL_FAIL | RISE_DEL | Set response_status as RISE_FAIL; entry can be retried by appliance |

Regarding message format, an APBR message may include the following, by way of non-limiting example:
   a. operation mode: op_mode—ADD/DELETE
   b. rs_ipaddr—Real Server Ip Address for ACL rule and this will be used to discover the interface to apply the apbr rule.
   c. rs_port—real server port to match in the ACL.
   d. nexthop_ip—service appliance next hop IP address used as the action for matching the ACLE in the routemap.
   e. protocol—Protocol on which the ACL will be matched.
   f. vlan_id—appliance VLAN ID used to determine the VRF of the real server (RS). In an example, it is assumed that the RS and client are on the same VRF, but not necessarily the default VRF. In other words, if APBR is being used for multi-tenancy with multiple VLANs in difference VRFs, the appropriate VLAN pertaining to that VRF should be sent.

In certain embodiments, a plurality of virtual port channels (vPCs) may be used for redundancy purposes. For example, if one switch goes down, one or more additional switches may provide redundant operation to ensure that there is no downtime in the system. Advantageously, RISE service appliances may be configured to detect that a plurality of switches are operating in VPC mode, and self-configure to handle VPC traffic. This may include assigning all upstream VPC switches to a single port channel, and replicating all traffic to all upstream VPC switches. The VPC switches themselves may keep their states synchronized, such as via a VPC peer connection.

A system and method for providing an integrated service engine will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1A, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Enterprise 100 may encounter a variety of "network objects" on the network. A network object may be any object that operates on or interacts with enterprise network 170. In one example, objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, for example, a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, an external server 180, and an application repository 182 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Application repository 182 may represent a Windows or Apple "App Store" or update service, a Unix-like repository or ports collection, or other network service providing users 120 the ability to interactively or automatically download and install applications on client devices 110. In some cases, secured enterprise 100 may provide policy directives that restrict the types of applications that can be installed from application repository 182. Thus, application repository 182 may include software that is not malicious, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Figure 1B:
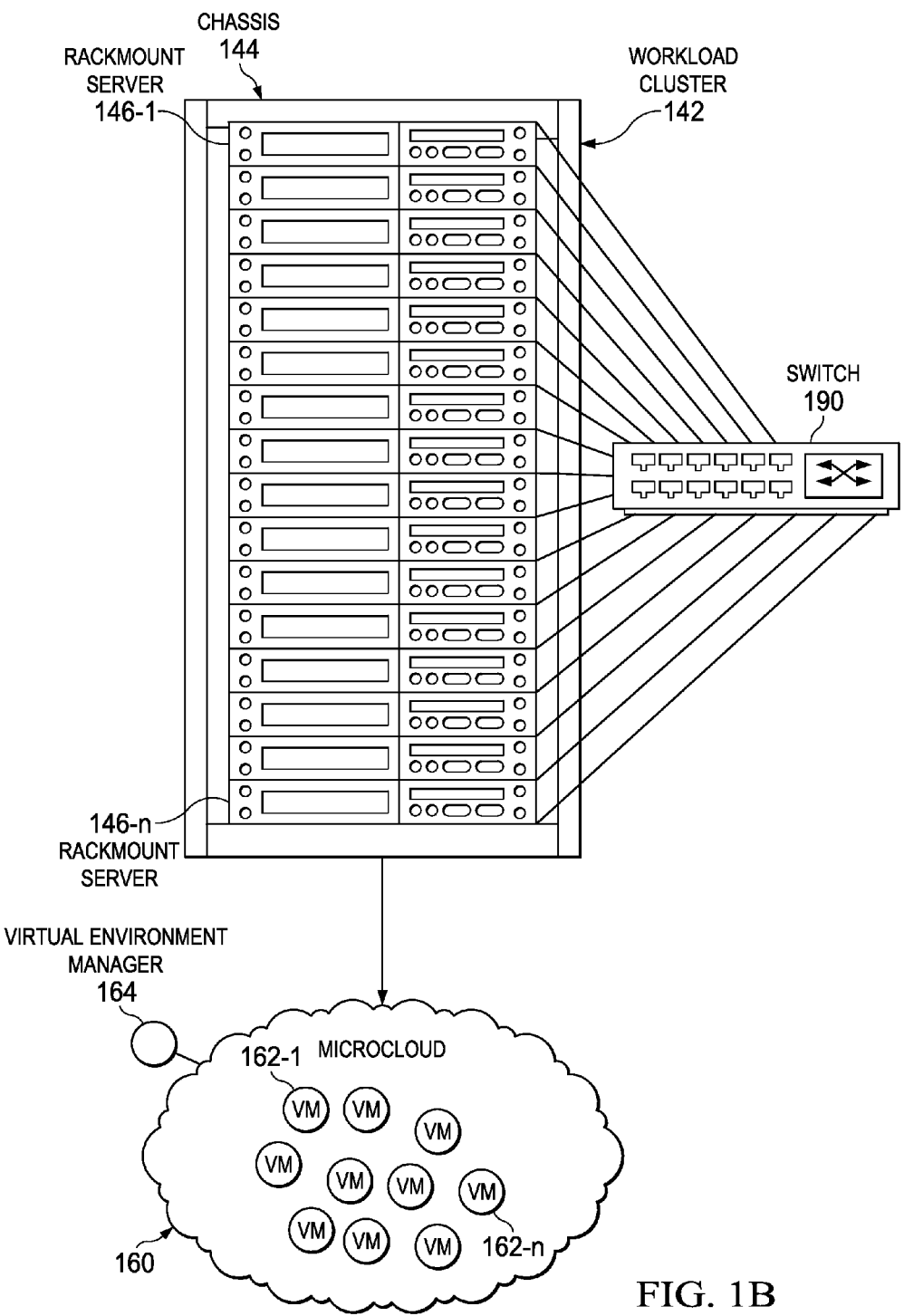
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2A:
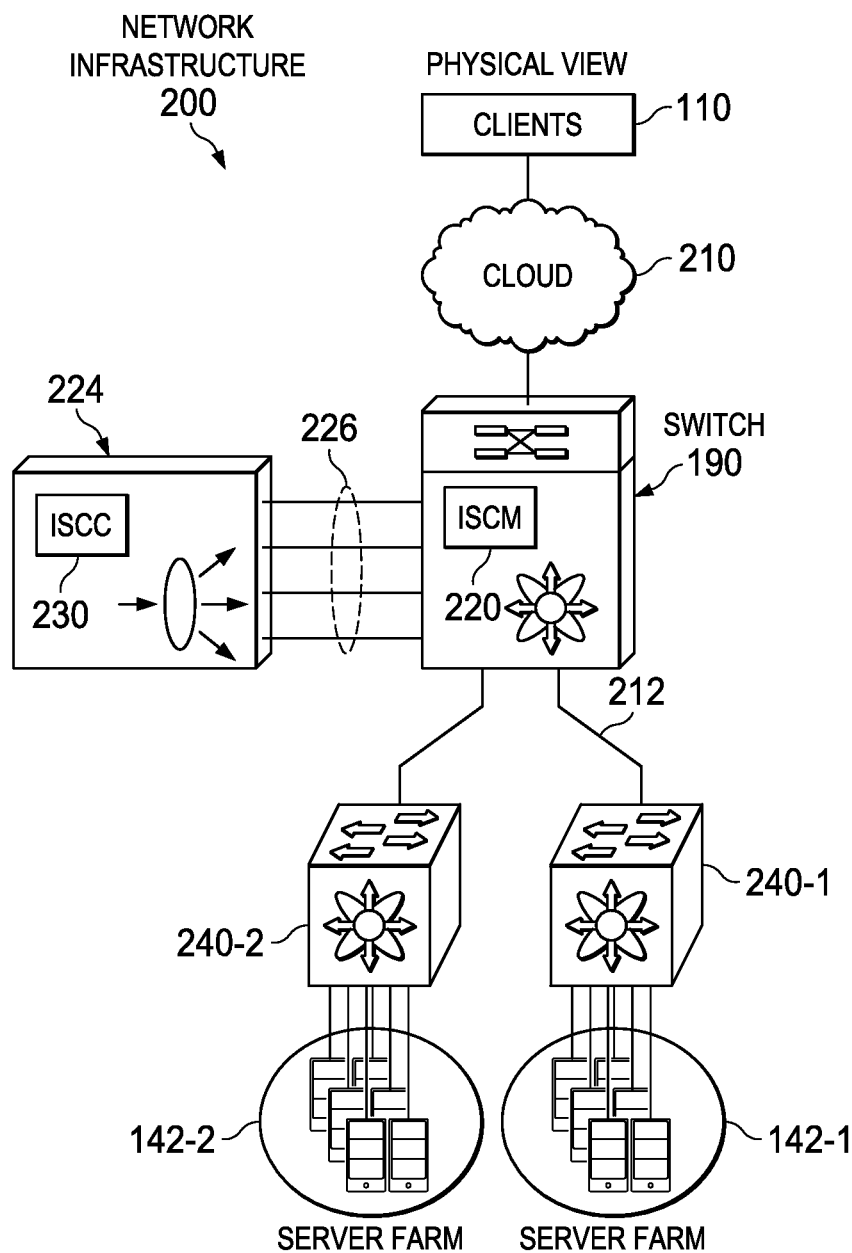
FIG. 2A is a is a simplified schematic diagram illustrating a physical view of a system for providing service appliances in a network environment according to one or more examples of the present Specification.
Figure 2B:
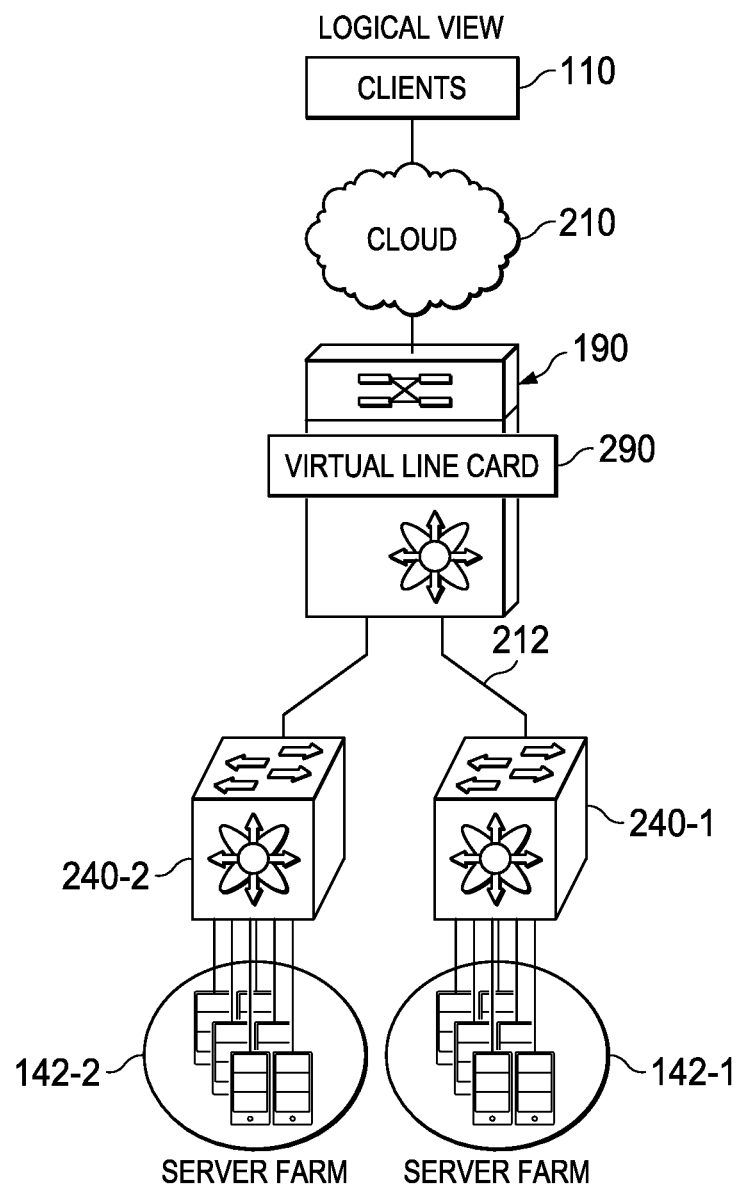
FIG. 2B is a simplified schematic diagram illustrating a logical view of the system according to one or more examples of the present Specification.

FIGS. 2A and 2B show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 2A is a simplified schematic diagram illustrating a physical view of a system 110 for providing service appliances in a network environment. FIG. 2A includes a network (illustrated as multiple links 212) that connects one or more server farms 142-1 and 142-2 to one or more clients 110 via a cloud 210. Cloud 210 may encompass any public, semi-public, and/or private networks including enterprise networks, an Internet or intranet, community networks, etc. Individual servers in server farm 142-1 and 142-2 may communicate within the same farm via switches 240-1 and 240-2, respectively. Servers in server farm 142-1 may communicate with servers in server farm 142-2 via a switch 190 in this particular example implementation.

A service appliance 224 may connect to switch 190 over a communication channel 226 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 110, communication channel 326 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc. In some cases, switch 190 may be configured with an intelligent service card manager module (ISCM) 220, and service appliance 224 may be configured with a corresponding intelligent service card client module (ISCC) 230. ISCM 220 and ISCC 230 can form part of a Remote Integrated Service Engine (RISE) infrastructure for configuring service appliance 224 on the switch, e.g., as a virtual line card in switch 190.

FIG. 2B is a simplified schematic diagram illustrating a logical view of system 110. In some cases, ISCC 230 and ISCM 220 may be configured to allow service appliance 224 to appear as a virtual line card 290, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 290 is interchangeable (in certain instances) with ISCM 220. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

In an example, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 110. For example, setting up service appliance 224 for network configurations may be unnecessary. Substantially all such configurations may be made via switch 190, instead of service appliance 224. Service appliance 224 may offload (i.e., transfer) any network (e.g., L2/L3 network) specific control plane and data plane operations to switch 190. Data path acceleration that leverages an application specific integrated circuit (ASIC) (potentially embedded in switch 190) may also be possible in various embodiments. Switch 190 may communicate control messages to service appliance 224 over communication channel 326. Thus, configuration and provisioning of services within service appliance 224 may be implemented via switch 190.

Note that the numerical and letter designations assigned to the elements of FIGS. 2A and 2B do not connote any type of hierarchy; the designations are arbitrary and have been used for purposes of teaching only. Such designations should not be construed in any way to limit their capabilities, functionalities, or applications in the potential environments that may benefit from the features of system 110. For ease of description, only two representative server farms are illustrated in FIGS. 2A and 2B. Any number of server farms and switches may be connected in the network without departing from the broad scope of the present disclosure.

For purposes of illustrating the techniques of system 110, it is important to understand the communications in a given system such as the system shown in FIGS. 2A and 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 2A and 2B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 2A and 2B may be coupled to one another through one or more interfaces employing any suitable connection (wired or wireless), which provides a viable pathway for electronic communications. Additionally, any one or more of these elements may be combined or removed from the architecture based on particular configuration needs. System 110 may include a configuration capable of transmission control protocol/Internet protocol (TCP/IP) communications for the electronic transmission or reception of packets in a network. System 110 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 110, including switches 190, 240-1, and 240-2, may include any type of network element connecting network segments. For example, switches 190, 240-1, and 240-2 may include a multi-port network bridge that processes and routes data at a data link layer (Layer 2). In another example, switches 190, 240-1, and 240-2 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 190, 240-1, and 240-2 may be integrated into other network devices such as gateways, routers, or servers. In various embodiments, switches 190, 240-1, and 240-2 may be managed switches (e.g., managed using a command line interface (CLI), a web interface, etc.).

Communication channel 326 may include a port-channel, which can encompass an aggregation of multiple physical interfaces into one logical interface, for example, to provide higher aggregated bandwidth, load balancing and link redundancy. Communication channel 326 with multiple links can provide a high availability channel: if one link fails, traffic previously carried on this link can be switched to the remaining links. Communication channel 326 may contain up to 16 physical communication links and may span multiple modules for added high availability. In one embodiment, communication channel 326 can represent a port-channel with an aggregation of four point-to-point communication links over multiple ports. In another embodiment, communication channel 326 can represent a virtual port-channel (vPC).

Although FIGS. 2A and 2B show server farms 142-1 and 142-2, it should be appreciated that system 110 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, system 110 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
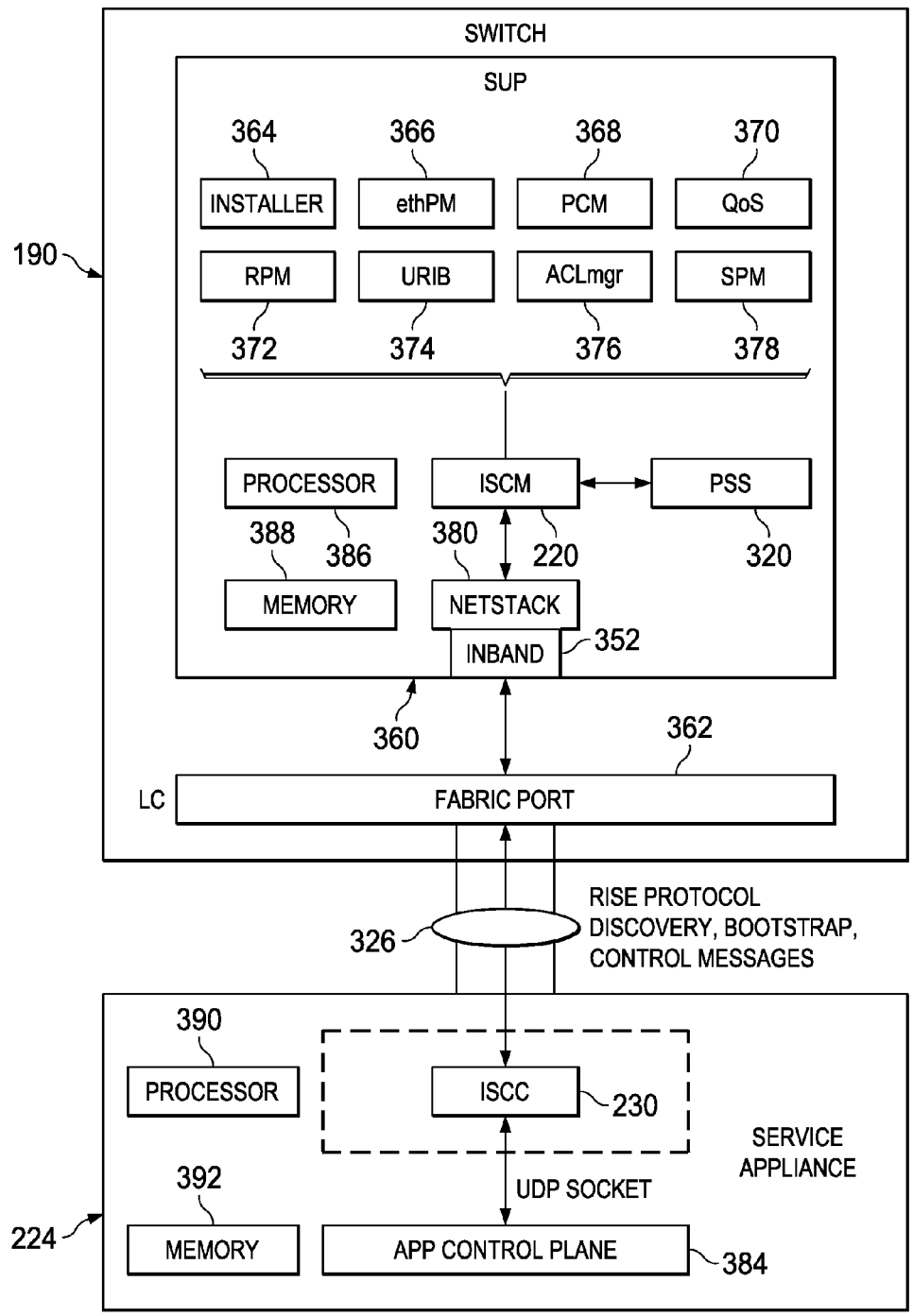
FIG. 3 is a block diagram of a hardware element according to one or more examples of the present Specification.

FIG. 3 is a simplified block diagram illustrating example details of system 110 according to embodiments of the present disclosure. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions. ISCM 220 may be provisioned in supervisor engine 360 to provide RISE related functionalities. ISCM 220 may manage one or more service modules, including in-chassis service modules and remote service modules. A persistent storage service (PSS) 320 may also be provided for persistently storing data between sessions.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processor may also be provided for specialized or support functions. In some examples, the processor is a programmable hardware device, which in this Specification expressly excludes a general-purpose CPU.

ISCM 220, in one example, is an engine operable to carry out computer-implemented methods as described in this Specification. It should also be noted that in various embodiments, the following description can apply equally to ISCC 230.

ISCM 220 may include one or more processors, and one or more non-transitory computer-readable mediums having stored thereon executable instructions operable to instruct a processor to provide ISCM and related services. As used throughout this Specification, an "engine" includes any combination of one or more logic elements, of similar or dissimilar species, operable for and configured to perform one or more methods provided by the engin. Thus, ISCM 220 may comprise one or more logic elements configured to provide methods as disclosed in this Specification. In some cases, ISCM 220 may include a special integrated circuit designed to carry out a method or a part thereof, and may also include software instructions operable to instruct a processor to perform the method. In some cases, ISCM 220 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that ISCM 220 may also include other hardware and software, including configuration files, registry entries, and interactive or user-mode software by way of non-limiting example.

In one example, ISCM 220 includes executable instructions stored on a non-transitory medium operable to perform a method according to this Specification. At an appropriate time, such as upon booting switch 190 or upon a command from an operating system or a user 120, ISCM 220 may retrieve a copy of stored instructions from storage and load them into system memory. ISCM 220 may then iteratively execute the instructions to provide the desired method.

In another example, ISCM 220 includes logic executed on an ASIC, FPGA, or other low-level hardware device specifically programmed to carry out the functions of ISCM 220. In one case, any portions of ISCM 220 that are not hard-coded into the logic may be loaded from a firmware or similar memory. In this case, ISCM 220 may operate without the benefit of an operating system, to improve speed and efficiency.

According to various embodiments, ISCM 220 may offer various functionalities such as handling (i.e., accommodating, managing, processing, etc.) RISE messages (e.g., in MTS format), high availability activities, timer events, packet switch stream, American Standard Code for Information Interchange (ASCII) generation, logging, event handling, health monitoring, debugging, etc. ISCM 220 may be a finite state machine utility (FSMU) based application (e.g., which indicates an abstract machine that can be in one of a finite number of states). In various embodiments, ISCM 220 may have a well-defined MTS seamless authentication protocol (MTS SAP) assigned and it can open a socket-based MTS queue and bind to the well-defined SAP such that other processes may communicate with it.

In various embodiments, ISCM 220 may also maintain an array of MTS operation code ("opcode"), which can define how to process a received MTS message. The array may include per-opcode specific MTS flags, handler functions, etc. ISCM 220 may be configured to receive CLI driven MTS messages, MTS notifications (such as event driven messages indicating, for example, that a particular VLAN is up or down), and MTS request/responses. In various embodiments, ISCM 220 may be configured so that MTS-based communication with other processes may be non-blocking and asynchronous. Thus, ISCM 220 may handle multiple events (which can arrive at any time) for the same resource such that the state of the resource is consistent (and not compromised). A similar opcode can be provided even in non-MTS messages, which serves to indicate how to a switch or a service can process the message.

After ports (e.g., appliance ports and switch ports) have been configured in RISE mode, ISCM 220 and ISCC 230 may perform auto-discovery and bootstrap to establish an appropriate control channel. After the control channel is established, applications in service appliance 224 may send control messages (e.g., using the UDP socket interface) to ISCC 230 through an application control plane 384. Application control plane 384 generally encompasses one or more software components for performing workflow management, self-management, and other application control layer processes. ISCC 230 may forward the control messages to ISCM 220 of switch 190 over communication channel 326. In example embodiments, ISCM 220 and ISCC 230 may communicate via UDP packets; however, various other protocols and formats may be accommodated by the teachings of the present disclosure. Supervisor 360 may be provisioned with (or have access to) processor 386 and a memory 388 for performing its various functions. ISCM 220 may use processor 386 and memory 388 to perform RISE related functions in switch 190. Similarly, service appliance 224 may be provisioned with (or have access to) a processor 390 and a memory 392. ISCC 230 may use processor 390 and memory 392 to perform RISE related functions in service appliance 224.

As disclosed herein, RISE includes advanced features, including the following by way of non-limiting example.

Automated Policy-Based Routing

In an example, network administrator 150 configures policy-based routing (PBR) rules to ensure that return traffic from the real server reaches service appliance 224. Switch 190 may be, for example, a Cisco® N7K switch, and a control channel of switch 190 may be used to automate the task of creating PBR rules. Service appliance 224, as a function of its configuration, knows the IP address of the real servers in workload cluster 142, and sends this information to switch 190 in a request. Switch 190 in turn creates the PBR rules for the associated switch virtual interfaces (SVIs).

Figure 4:
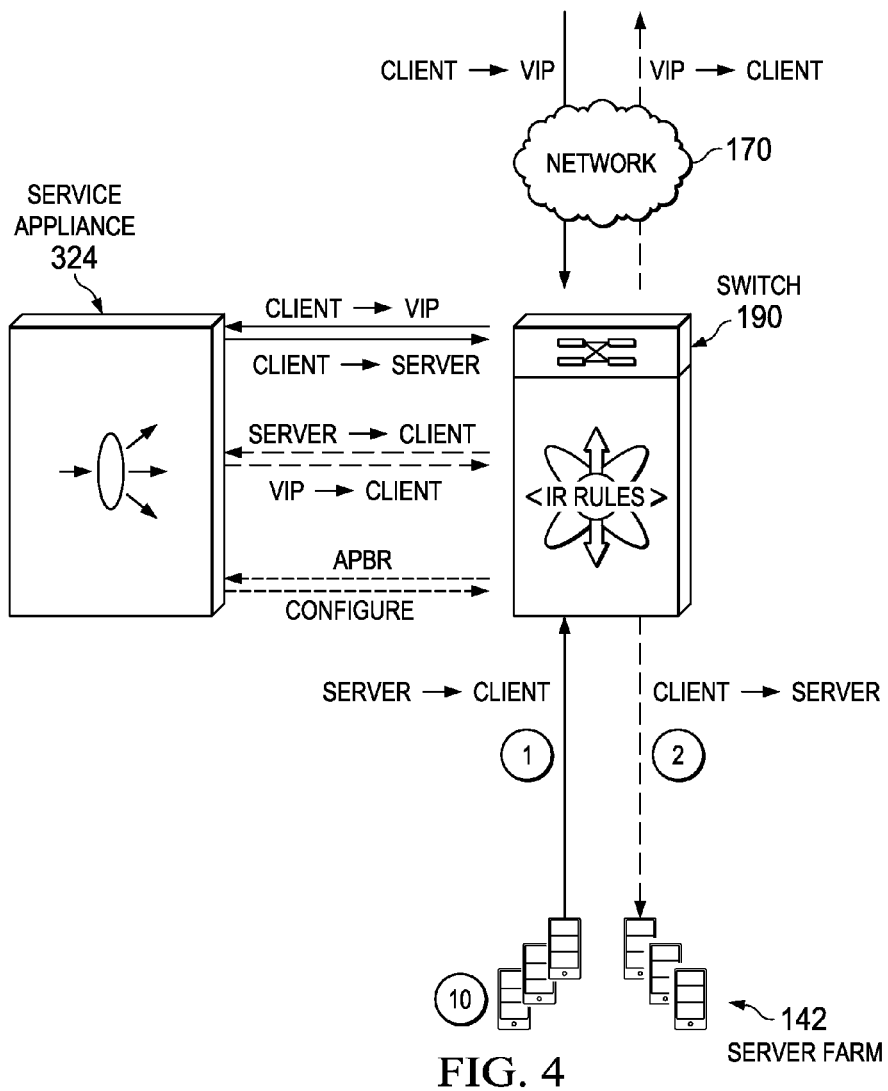
FIG. 4 is a block diagram of a network topology according to one or more examples of the present Specification.

With automated PBR (APBR), service appliance 224 may perform the method illustrated in FIG. 4.

a. Service appliance 224 sends APBR messages to switch 190 after applying the necessary configuration. Service appliance 224 also sends to switch 190 a list of servers (e.g., IPs, ports and protocol) and the IP of the next hop interface.

b. Switch 190 applies the rules for its local servers and propagates the rules for servers attached to the neighboring switch. For the local servers, it creates ACLs and route maps. For non-local servers, it sends APBR messages to other switches.

APBR allows service appliance 224 to program policies on interface facing switch 190 to redirect return traffic to service appliance 224 set up in "one-arm mode." In one-arm mode, an application control engine (ACE) is configured with a single VLAN that handles both client requests and server responses. In an example, one-arm mode is configured with client-source network address translation (NAT) or PBR to send requests through the same VLAN to the server. Since it is desirable to retain the client IP for the return traffic, the APBR policies may set the "next hop" IP of traffic reaching switch 190 to the IP of service appliance 224 without modifying the packet. Service appliance 224 may then direct the packet to the client.

In an example, APBR request sent by service appliance 224 includes the real server IP, port and protocol. On receiving the request ISCM 220 creates an access control list (ACL) using the above attributes for each service appliance's "next hop" IP, and incorporates it into a route map. The route map may be applied on the interface to the switch through which the real server can be best reached. In an example, the interface on which the APBR policy is applied can be any L3 interface.

Figure 5:
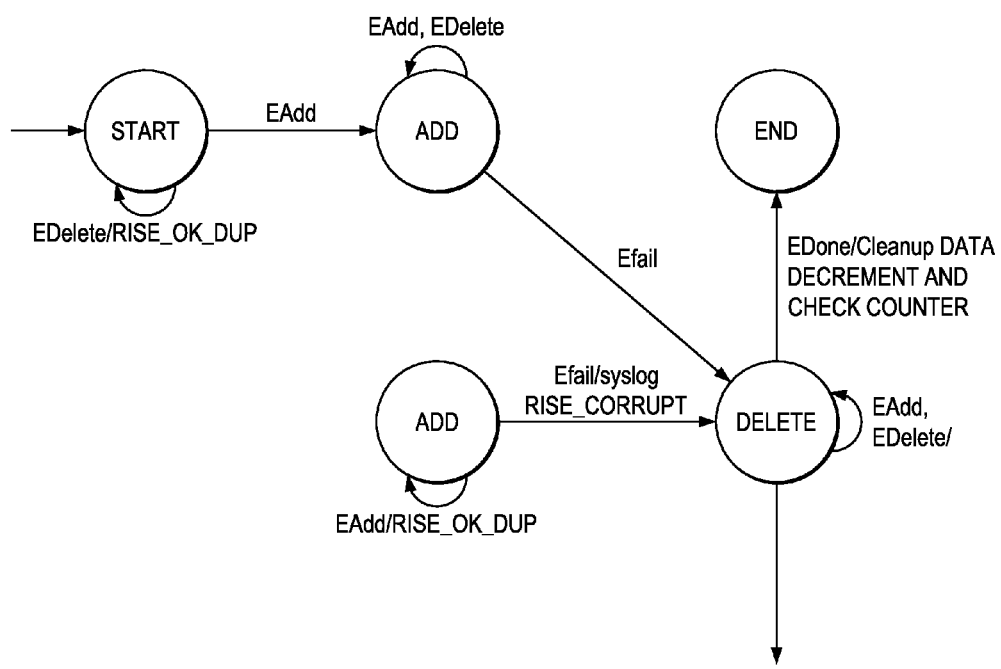
FIG. 5 is a block diagram of a state machine according to one or more examples of the present Specification.

FIG. 5 is a block diagram of a state machine according to one or more examples of the present Specification. The state machine illustrates that the signal EAdd can be used in either ADD state to ADD a rule. If the ADD fails, then it may be deleted.

In an example, when an APBR bulk message is received, ISCM 220 looks up the APBR entry based on parameters in the request. If the return value is a non-null entry, ISCM 220 performs an action according to the table below, and terminates further processing of the APBR entry.

TABLE 2

| ISCM Actions | | |
| --- | --- | --- |
| Route_state | Op_mode | Action |
| ISCM_APBR_ADD_IN_PRO-GRESS | RISE_ADD/ RISE_DELETE | Set response_status as RISE_ADD_IN_PROG; do no processing |
| ISCM_APBR_DEL_IN_PRO-GRESS | RISE_ADD/ RISE_DELETE | Set response_status as RISE_DEL_IN_PROG; do no processing |

TABLE 2-continued

ISCM Actions

| Route_state | Op_mode | Action |
|---|---|---|
| ISCM_APBR_ADD_DONE | RISE_ADD | Set response_status as RISE_OK_DUP; syslog; do no processing |
| ISCM_APBR_CORRUPT | RISE_ADD/ RISE_DELETE | Set response_status as RISE_CORRUPT; syslog; do no processing |

For all other valid entries, ISCM 220 creates and initializes the context and passes it to the event sequence. In an example, ISCM 220 starts one event sequence for each entry in the bulk message. Each event sequence may operate on one APBR entry, and this information is passed to the different steps in the event sequence via the "index" parameter in the context. A pointer to a counter is set equal to the number of entries in the APBR message and stored in the context. At the event sequence 'done' step for each event sequence, the response status is set to RISE_OK and the counter is decremented and checked to see if it equals 0.

Similarly, at the event sequence 'fail' input, the response status is set to RISE_FAIL/RISE_CORRUPT and the counter is decremented and compared to 0. If an ADD was in progress, the response_status is marked as RISE_RETREAT and delete sequence is started for that entry. This action is a best effort case to remove any partially added APBR configuration. If counter is equal to 0, all the event sequences have completed and a response is sent to service appliance 224. The route_state of the APBR entry may be set according to the state machine diagram of FIG. 5, as explained in more detail in connection with Table 1 above.

Figure 6:
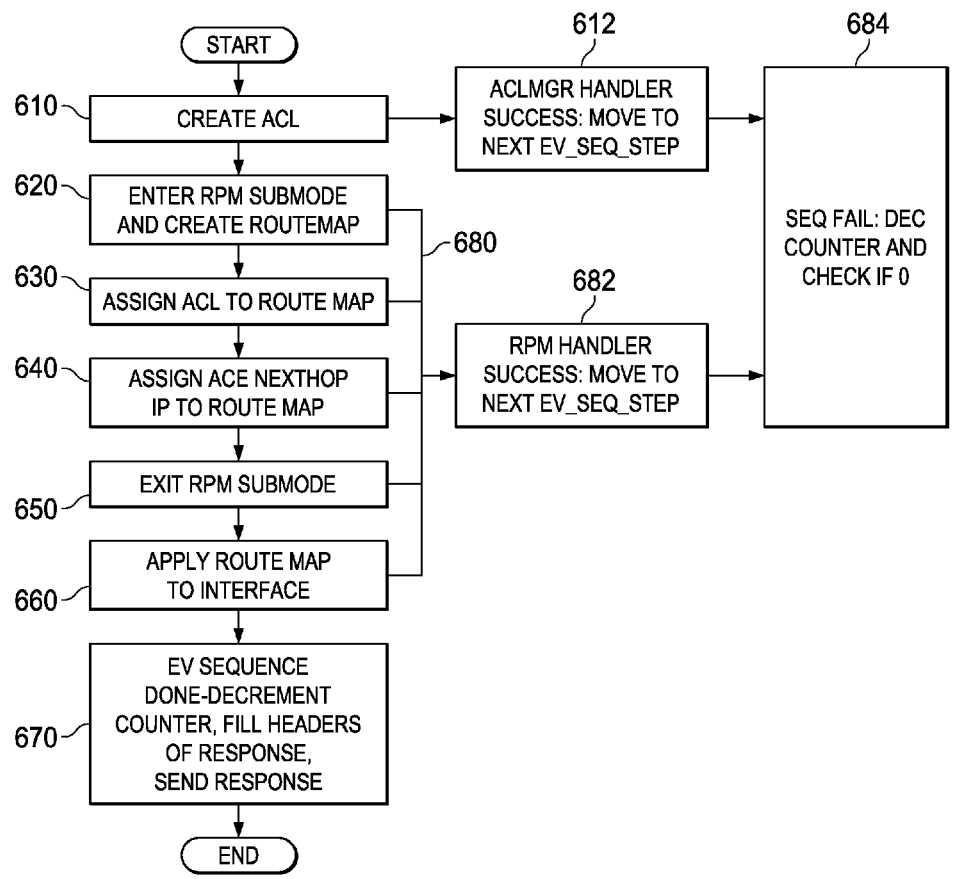
FIG. 6 is a flow chart of a method according to one or more examples of the present Specification.

FIG. 6 is a flow chart of an APBR create/delete event sequence according to one or more examples of the present Specification.

ISCM 220 may also be configured to deal with corrupt state behavior. In an example, ISCM 220 interacts with several components like RPM 372 and ACLMgr 376 to process an APBR entry. One or more of these may encounter internal errors, which may cause the APBR action to fail. To aid in usability and troubleshooting, ISCM 220 may record failures and display them to a user via a user command such as "show." The user may then manually delete the erroneous configuration. Requiring manual user intervention may be useful in certain embodiments because an internal error may indicate a larger issue such as memory corruption or system overload.

In an embodiment, in the case of a failure, the error code is saved in the context of the event sequence and the error is provided to a system logging utility such as the Linux syslog.

The following two error codes may result in the APBR entry being marked as corrupt. Internally, the entry is stored in runtime PSS 320. The number of sequences in apbr_last_seq_map is then decremented, and service appliance 224 receives a RISE_CORRUPT response.
    SYSERR_ISCM_RPM_ERROR
    SYSERR_ISCM_ACL_ERROR
It may also be desirable to mark an APBR entry as corrupt in the case of a timeout at any step of the delete event sequence. If the failure reason is ES_TIMEOUT, then the APBR entry may be removed from a configuration PSS and stored in a runtime PSS.

If a corrupt entry is retried again from a service appliance 224, it may be identified as corrupt by looking up a value such as apbr_avl (a binary tree structure for storing information related to APBR). ISCM 220 may then send back RISE_CORRUPT and not process it again.

Corrupt entries may be displayed to and end user via a command, such as the "show" command mentioned above. In response, a string indicating the reason for the corruption may be displayed.

After switch 190 resets or performs a switchover, all corrupt APBR entries in ISCM 220 may be restored from runtime PSS 320. Since the corrupt entries are not stored in running config PSS, they may be lost on reload or in-service software upgrade (ISSU), in which software is upgraded "hot" (i.e., while in service).

For other ISCM internal failures, the event sequence may be aborted and the state maintained.

In an example, the method of FIG. 6 is used to create an APBR policy.

In block 610, ISCM 220 creates an ACL, for example with the name rise-system-acl-<service_name>-<rs ip>-<rmap seq no>. This may set a permit rule for the given RS, IP, protocol, and source port. These may be specified in an APBR message as rs_ipaddr and rs_port. An example rule may be as follows:
IP access list _rise-system-acl-1-1.1.2.2-1
10 permit 0 1.1.2.2/32 any
In block 612, the ACLMgr reports success for the operation.

In block 620, ISCM 220 enters RPM submode and creates a route map. ISCM 220 may send a request to RPM 372 to enter a submode and create a routemap with the name and sequence number determined in block 610. For example:
route-mapzrise-system-rmap-1-1.1.1.100, permit, sequence 1
    Match clauses:
        ip address (access-lists): rise-system-acl-1-1.1.2.2
    Set clauses:
        ip next-hop 1.1.1.100
In block 630, ISCM 220 assigns the ACL to the route map. To do this, ISCM 220 sends a request to RPM 372 to assign an ACL to routemap name and sequence number determined in block 610.

In block 640, ISCM 220 may assign the ACE next hop IP to the route map. To do this, ISCM 220 sends a request to assign a RISE appliance nexthop IP to routemap name and sequence number determined in block 610.

In block 650, ISCM 220 exits RPM submode. Specifically, ISCM 220 sends a request to assign a RISE appliance to exit submode with routemap name and sequence number determined in block 610.

In block 660, ISCM 220 applies the route map to the appropriate RS nexthop interface. ISCM 220 sends a request with routemap name and sequence number determined in block 620 and associates the route map with the RS nexthop interface. For example:
interface Vlan200
    no shutdown
    ip address 1.1.2.1/24
    ip policy route-map rise-system-rmap-1-1.1.1.100
In block 670, the sequence is done. ISCM 220 decrements its "try" counter (the number of times the sequence should be tried before failing), fills a response header, and sends its response.

The response_status may then be set to one of RISE_OK, RISE_FAIL, RISE_OK_DUP, or RISE_CORRUPT based on the success, failure, duplication, or corruption of the APBR policy creation. For responses with RISE_OK_DUP or RISE_CORRUPT, service appliance 224 should not retry the request and may instead fix its cache accordingly.

As seen in metablock 680, If an event sequence fails because of errors returned by RPM 372 or ACLMgr 376, or any of the blocks herein timing out, control may pass to block 682. Block 682 includes an RPM error handler. The APBR entry being processed by the event sequence may then be marked as corrupt. Corrupt entries may not be displayed by a user command such as "show rise status."

A similar process may be used for deleting an APBR policy, and in an example is a functional opposite of adding an APBR policy. This may comprise, for example:
 a. Evaluate the deletion.
 b. Remove the routemap from the interface
 c. Delete the routemap. In this case, ISCM 220 sends a request to RPM 372 to assign an ACL to the routemap name and sequence number determined in operation 1.
 d. Delete the ACE rule in ACL. Here, ISCM 220 sends a request to assign a RISE appliance nexthop IP to the routemap name and sequence number determined in operation 1.
 e. Delete the ACL. ISCM 220 sends a request to assign a RISE appliance to exit submode with the routemap name and sequence number determined in operation 1.

Seq Done/Fail, as appropriate. If needed, ISCM 220 sends a response to service appliance 224 with an error code.

Figure 7:
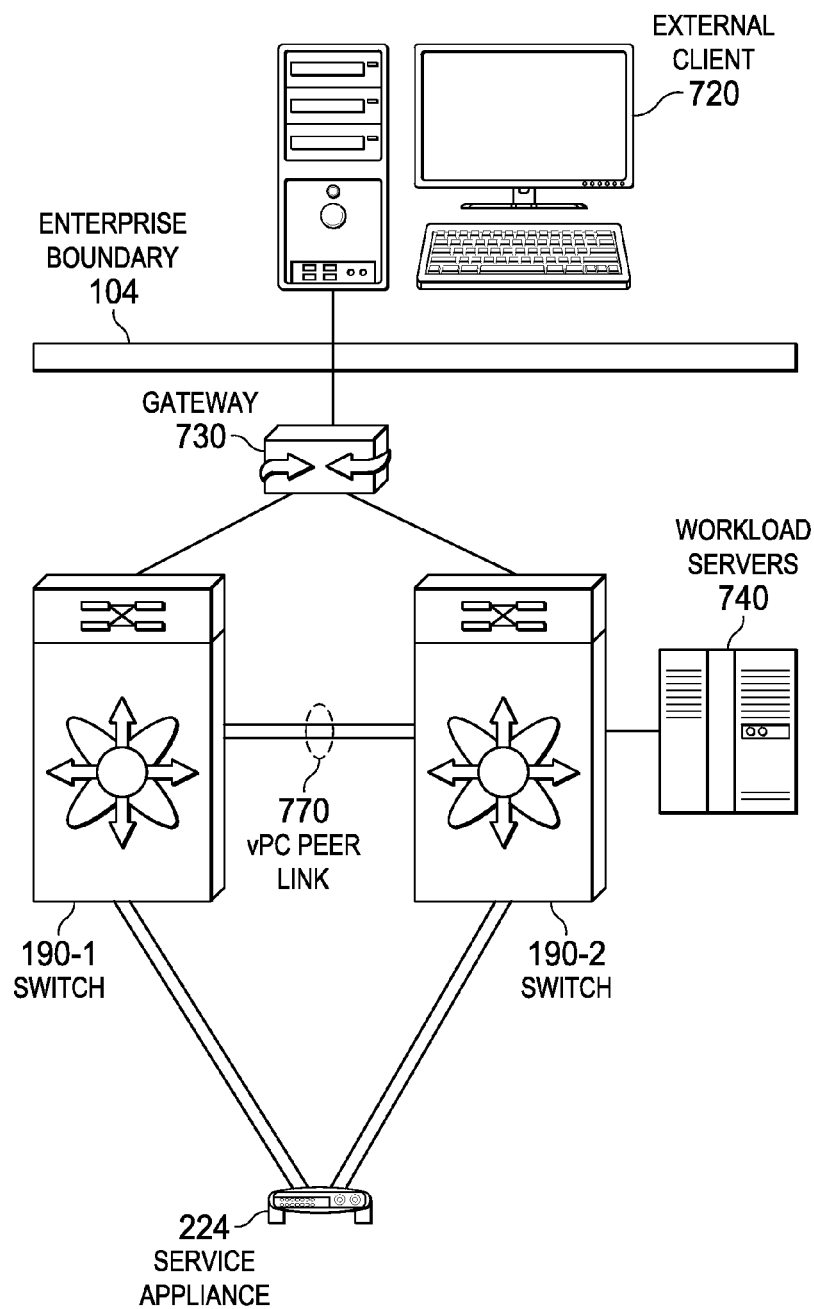
FIG. 7 is a block diagram of a network employing virtual port channels according to one or more examples of the present specification.

FIG. 7 is a network diagram of a service appliance 224 in situ in a network according to one or more examples of the present specification. In this example, enterprise 100 communicates across enterprise boundary 104. Enterprise 100 may operate externally-facing services, such as a website, e-mail, or other similar services, which may be accessible to external client 720. To handle large loads, enterprise 100 may provide a plurality of workload servers 740 configured to handle the traffic.

Gateway 730 provides a single point of entry for interfacing with external client 720. Gateway 720 routes traffic to two or more switches 190, in this case switch 190-1 and switch 190-2. Switches 190 may switch or route traffic to a service appliance 224, such as a load balancer. Load balancer 224 may then assign traffic to one workload server within the pool of workload servers 740. Service appliance 224 then routes traffic back to switches 190, which forward the traffic to the appropriate node, such as the appropriate workload server.

In this example, switches 190-2 are provided in a virtual port channel (VPC) configuration. This means that the two switches service a single port channel redundantly. With the VPC configuration, the loss of one switch 190 does not bring the entire network down. Rather, the other switch 190 is able to continue handling traffic until its sister switch 190 is brought back up or replaced. In normal operation, traffic may simply be divided between the switch based on rules, such as a simplified form of load balancing. Switches 190 may continuously synchronize their states via VPC peer link 770.

To provide VPC, service appliance 224 may need to be configured to operate in a VPC mode. However, it is desirable to not require manual configuration by a system administrator, as this can significantly increase the work necessary to effect changes to a network. Rather, it is desirable for service appliance 224 to be configured to automatically detect that switches 190 are operating in VPC mode, and to self-configure VPC mode.

In some cases, Layer 2 (L2) packets coming from one or more switches 190 may include specific embedded VPC identifiers. Thus, switches 190 can send out L2 packets with such identifiers, and can rely on service appliances 224 to self-configure appropriately.

In another example, service appliance 224 may implicitly determine that switches 190 are in VPC mode. In one example, service appliance 224 may detect that two different upstream switches 190 (i.e., two switches with two different IP addresses) share a common identifier. Thus, service appliance 224 may infer that the switches 190 are operating in VPC mode, and may self-configure appropriately.

Figure 8:
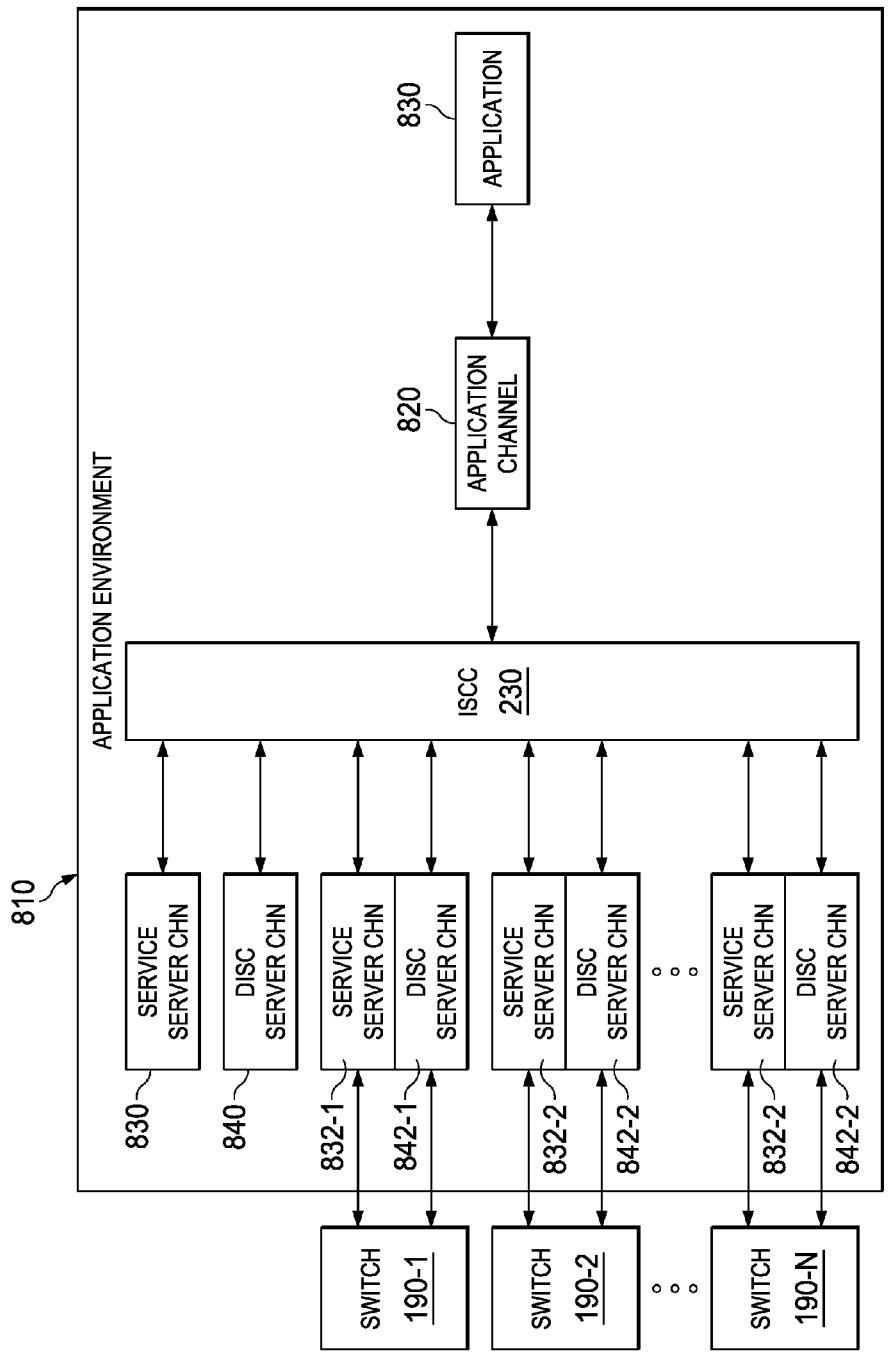
FIG. 8 is a block diagram of an application environment according to one or more examples of the present specification

FIG. 8 is a block diagram of a network environment according to one or more examples of the present specification. This figure illustrates that more than two switches 190 may be configured in VPC operation.

In this example, an application environment 810 includes an ISCC 230. ISCC 230 communicatively couples to an application 830 via an application channel 820. ISCC may detect that a plurality of switches 190-1-190-n are configured to operate in VPC mode. Thus, ISCC 230 self-configures a service server channel 830 and discovery server channel 940. For each switch, ISCC 230 self-configures a service server channel 832-1-832-n, and a discovery server channel 842-1-842-n.

During a RISE VPC bootstrap sequence, service appliance 224 may inspect incoming L2 packets from the plurality of switches 190-1-190-n. If a non-zero RISE VPC identifier is seen, or if an identical RISE service name is provided for each of the plurality of switches 190, then service appliance 224 may create the necessary VLANs to handle the data traffic, and bundle the plurality of physical links into a single port channel. Once the RISE VPC service is created on service appliance 224, service appliance 224 can use the RISE VPC service to program all of the connected upstream switches 190.

When service appliance 224 is deployed in a VPC topology, and determines to leverage the RISE features for programming a policy or configuration on upstream switches 190, bi-directional multiplexing may be used to hide complexity from service appliance 224. This allows service appliance 224 to connect to a large number of switches 190 without having a detailed knowledge of the actual communication channels. In one example, service appliance 224 sends policy programming messages with RISE common headers specifically populated with details of the intended upstream switch. With the help of these values in the common header, an SDK may perform service table lookup and send messages on an appropriate connection to the intended upstream switch.

Figure 9:
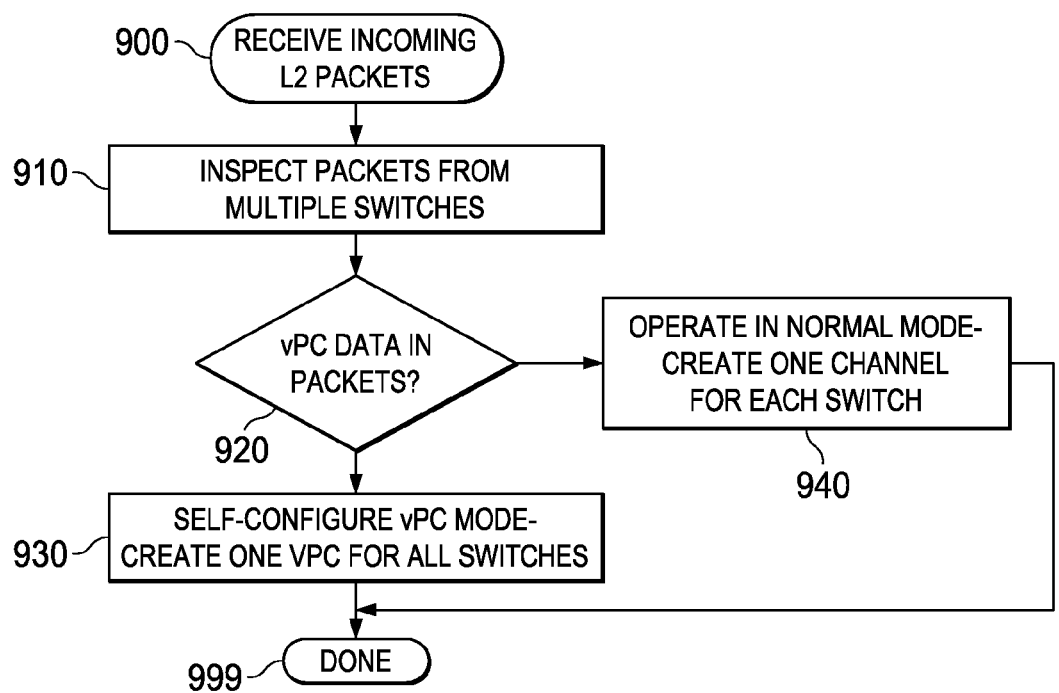
FIG. 9 is a flow chart of a method of providing a virtual port channel according to one or more examples of the present specification.

FIG. 9 is a flow chart of a method performed by a service appliance 224 self-configuring for VPC operation.

Starting in block 900, at block 910, service appliance 224 inspects incoming L2 packets from switches 190.

In decision block 920, service appliance 224 determines whether the L2 packets contain VPC data. This may include looking for explicit VPC directives within the packets, looking for a plurality of switches 190 that share a common identifier, or any other suitable method of identifying VPC operation.

In block 930, if service appliance 224 has found VPC data in the L2 packets, then it self-configures for VPC mode as described herein. This may include creating a single VPC that will be shared among all switches 190.

In block 940, if service appliance 224 did not detect any VPC data in the L2 packets, then it self-configures to operate in normal mode. In this case, service appliance 224 creates a separate port channel for each upstream switch 190 that it has identified.

In block 999, the method is done.

The system described herein may also be configured to handle in-service software upgrades (ISSU). In the case that an upstream switch 190 signals an ISSU, dynamic message throttling, or other appropriate event, RISE VPC may cache all messages and send them to the upstream switch 190 when the event is complete. In the case of a consistent failure, RISE VPC may inform service appliance 224 of the failure and cleanup from cache.

According to the various embodiments disclosed herein, there is shown by way of example a computing apparatus for providing an integrated service engine on a service appliance, comprising: one or more logic elements comprising a service appliance engine operable for performing a service appliance function; and one or more logic elements comprising a protocol engine operable for: detecting that a plurality of upstream network switches are connected to the service appliance in a virtual port channel configuration; and provisioning virtual port channel (VPC) services comprising replicating a routing policy to each of the plurality of upstream network switches.

There is further disclosed an example wherein the protocol engine further comprises an integrated service engine operable for performing automated policy-based routing.

There is further disclosed an example wherein detecting that the plurality of upstream network switches are connected to the service appliance comprises inspecting incoming layer 2 (L2) frames from the plurality of upstream network switches.

There is further disclosed an example wherein inspecting incoming L2 frames comprises determining that a plurality of upstream network switches share a common identifier.

There is further disclosed an example wherein inspecting incoming L2 frames comprises receiving an explicit VPC identifier message.

There is further disclosed an example wherein the protocol engine is further operable for creating a plurality of virtual local area networks (VLANs) to correspond to the plurality of upstream network switches.

There is further disclosed an example wherein the plurality of upstream network switches comprises three or more upstream network switches.

There is further disclosed an example wherein the protocol engine is further operable for detecting that one of the plurality of upstream network switches fails to respond, and performing n retries, wherein n is selected to be an effective number of retries to detect a temporarily-unavailable switch.

There is further disclosed an example wherein the protocol engine is further operable for determining that an in-service update is in progress, and caching all messages to or from the plurality of upstream switches until the in-service update is complete.

There is further disclosed an example of one or more tangible non-transitory computer-readable storage mediums having stored thereon executable instructions for providing the computing apparatus of any of the preceding examples, or performing a method according to any of the preceding examples.

There is further disclosed an example of a method comprising performing any or all of the operations disclosed in any of the preceding example.

There is further disclosed an example of an apparatus comprising means for performing the method of any of the preceding examples.

There is further disclosed an example, wherein the means comprise a computing apparatus.

There is further disclosed an example, wherein the means comprise a processor and a memory.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 110 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 110 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 110 may be applicable to other exchanges, formats, or routing protocols. Moreover, although system 110 has been illustrated with reference to particular elements and operations that facilitate the communication process, these elements, and operations may be replaced by any suitable architecture or process that achieves the intended functionality of system 110.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computing apparatus for providing an integrated service engine on a service appliance, comprising:
   one or more logic elements comprising a service appliance engine for performing a service appliance function; and
   one or more logic elements comprising a protocol engine for:
      self-configuring the service appliance to operate in one of a normal mode and a virtual port channel mode;
      detecting whether a plurality of upstream network switches are connected to the service appliance in a virtual port channel configuration;
      controlling the service application to operate in the normal mode unless the plurality of upstream network switches are detected to be connected to the service appliance in the virtual port channel configuration; and
      wherein operating in the virtual port channel mode includes provisioning virtual port channel (VPC) services comprising replicating a routing policy to each of the plurality of upstream network switches.

2. The computing apparatus of claim 1, wherein the protocol engine further comprises an integrated service engine for performing automated policy-based routing.

3. The computing apparatus of claim 1, wherein detecting whether the plurality of upstream network switches are connected to the service appliance comprises inspecting incoming layer 2 (L2) frames from the plurality of upstream network switches.

4. The computing apparatus of claim 3, wherein inspecting incoming L2 frames comprises determining that a plurality of upstream network switches share a common identifier.

5. The computing apparatus of claim 3, wherein inspecting incoming L2 frames comprises receiving an explicit VPC identifier message.

6. The computing apparatus of claim 3, wherein the protocol engine is further operable for creating a plurality of virtual local area networks (VLANs) to correspond to the plurality of upstream network switches.

7. The computing apparatus of claim 1, wherein the plurality of upstream network switches comprises three or more upstream network switches.

8. The computing apparatus of claim 1, wherein the protocol engine is further operable for detecting that one of the plurality of upstream network switches fails to respond, and performing n retries, wherein n is selected to be an effective number of retries to detect a temporarily-unavailable switch.

9. The computing apparatus of claim 1, wherein the protocol engine is further operable for determining that an in-service update is in progress, and caching all messages to or from the plurality of upstream switches until the in-service update is complete.

10. One or more non-transitory, computer-readable storage mediums having stored thereon executable instructions for providing a protocol engine, operable for:
    providing a service appliance function;
    providing an integrated service engine function;
    self-configuring the service appliance function to operate in one of a normal mode and a virtual port channel mode;
    detecting whether a plurality of upstream network switches are connected to the service appliance in a virtual port channel configuration;
    controlling the service application function to operate in the normal mode unless the plurality of upstream network switches are detected to be connected to the service appliance function in the virtual port channel configuration; and
    wherein operating in the virtual port channel mode includes provisioning virtual port channel (VPC) services comprising replicating a routing policy to each of the plurality of upstream network switches.

11. The one or more tangible, non-transitory computer-readable mediums of claim 10, wherein detecting whether the plurality of upstream network switches are connected to the service appliance comprises inspecting incoming layer 2 (L2) frames from the plurality of upstream network switches.

12. The one or more tangible, non-transitory computer-readable mediums of claim 11, wherein inspecting incoming L2 frames comprises determining that a plurality of upstream network switches share a common identifier.

13. The one or more tangible, non-transitory computer-readable mediums of claim 11, wherein inspecting incoming L2 frames comprises receiving an explicit VPC identifier message.

14. The one or more tangible, non-transitory computer-readable mediums of claim 11, wherein the protocol engine is further operable for creating a plurality of virtual local area networks (VLANs) to correspond to the plurality of upstream network switches.

15. The one or more tangible, non-transitory computer-readable mediums of claim 10, wherein the protocol engine is further operable for detecting that one of the plurality of upstream network switches fails to respond, and performing n retries, wherein n is selected to be an effective number of retries to detect a temporarily-unavailable switch.

16. The one or more tangible, non-transitory computer-readable mediums of claim 10, wherein the protocol engine is further operable for determining that an in-service update is in progress, and caching all messages to or from the plurality of upstream switches until the in-service update is complete.

17. A computer-implemented method of providing a protocol engine, comprising:
    providing a service appliance function;
    providing an integrated service engine function;
    self-configuring the service appliance function to operate in one of a normal mode and a virtual port channel mode;
    detecting whether a plurality of upstream network switches are connected to the service appliance in a virtual port channel configuration;
    controlling the service application function to operate in the normal mode unless the plurality of upstream network switches are detected to be connected to the service appliance function in the virtual port channel configuration; and
    wherein operating in the virtual port channel mode includes provisioning virtual port channel (VPC) services comprising replicating a routing policy to each of the plurality of upstream network switches.

18. The method of claim 17, wherein detecting whether the plurality of upstream network switches are connected to the service appliance comprises inspecting incoming layer 2 (L2) frames from the plurality of upstream network switches.

19. The method of claim 18, wherein inspecting incoming L2 frames comprises determining that a plurality of upstream network switches share a common identifier.

20. The method of claim 17, further comprising detecting that one of the plurality of upstream network switches fails to respond, and performing n retries, wherein n is selected to be an effective number of retries to detect a temporarily-unavailable switch.

21. The method of claim 17, wherein the protocol engine is further operable for determining that an in-service update is in progress, and caching all messages to or from the plurality of upstream switches until the in-service update is complete.

* * * * *